US009656334B2

(12) United States Patent
Saji et al.

(10) Patent No.: US 9,656,334 B2
(45) Date of Patent: May 23, 2017

(54) CUTTING-EDGE REPLACEABLE CUTTING TOOL

(71) Applicant: TUNGALOY CORPORATION, Iwaki-shi, Fukushima (JP)

(72) Inventors: Ryuichi Saji, Iwaki (JP); Kedar Suresh Bhagath, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 535 days.

(21) Appl. No.: 14/244,427

(22) Filed: Apr. 3, 2014

(65) Prior Publication Data
US 2014/0212226 A1 Jul. 31, 2014

Related U.S. Application Data (63) Continuation of application No. PCT/JP2012/075998, filed on Oct. 5, 2012.

(30) Foreign Application Priority Data

| Oct. 7, 2011 | (JP) | 2011-223054 |
| Oct. 7, 2011 | (JP) | 2011-223446 |

(51) Int. Cl.
*B23C 5/22* (2006.01)
*B23C 5/06* (2006.01)
(Continued)

(52) U.S. Cl.
CPC ............ *B23C 5/22* (2013.01); *B23B 27/1622* (2013.01); *B23C 5/06* (2013.01); *B23C 5/109* (2013.01);
(Continued)

(58) Field of Classification Search
CPC ...... B23B 2200/0461; B23B 2200/165; B23B 2200/3627; B23B 2205/12;
(Continued)

(56) References Cited

U.S. PATENT DOCUMENTS 5,236,288 A  8/1993  Flueckiger
5,810,518 A * 9/1998  Wiman ................. B23B 27/065
                                                    407/102

(Continued)

FOREIGN PATENT DOCUMENTS

EP    0 300 172      1/1989
EP    0 300 172 A2   1/1989
(Continued)

OTHER PUBLICATIONS

Extended search report dated Apr. 20, 2015 issued in European counterpart application (No. 12837720.7).

(Continued)

*Primary Examiner* — Sara Addisu
(74) *Attorney, Agent, or Firm* — Womble Carlyle (57) ABSTRACT

Provided is a cutting-edge replaceable cutting tool having a configuration capable of stably supporting a rotational moment acting on a cutting insert clamped on an insert mounting face of a body. It includes a cutting insert, a body including an insert mounting portion for removably mounting the cutting insert and a reception mechanism to receive the rotational moment acting on the cutting insert so as to rotate the cutting insert mounted on the insert mounting portion on a base surface, the mechanism including a first engagement portion formed on a lower surface of the cutting insert and a second engagement portion formed on the base surface of the insert mounting portion which is formed to engage with a specific portion of a surface defining the first engagement portion to receive the rotational moment.

15 Claims, 11 Drawing Sheets

(51) Int. Cl.
  *B23C 5/10* (2006.01)
  *B23B 27/16* (2006.01)
(52) U.S. Cl.
  CPC .... *B23C 5/2221* (2013.01); *B23B 2200/0461* (2013.01); *B23B 2200/165* (2013.01); *B23B 2200/3627* (2013.01); *B23B 2205/12* (2013.01); *B23B 2205/16* (2013.01); *B23B 2260/104* (2013.01); *B23C 2200/045* (2013.01); *B23C 2200/165* (2013.01); *B23C 2200/168* (2013.01); *B23C 2210/163* (2013.01); *B23C 2210/166* (2013.01); *B23C 2210/168* (2013.01); *Y10T 407/1906* (2015.01)
(58) Field of Classification Search
  CPC .......... B23B 27/1622; B23B 2260/104; B23B 2200/045; B23B 2200/168; B23C 5/22; B23C 5/06; B23C 5/109; B23C 5/2221; B23C 2210/163; B23C 2210/168; B23C 2210/166; B23C 2205/16
  See application file for complete search history.

(56) References Cited

U.S. PATENT DOCUMENTS

| | | | |
|---|---|---|---|
| 6,238,133 B1 | 5/2001 | DeRoche et al. | |
| 6,379,087 B1* | 4/2002 | Alexander, IV | B23B 27/1651 407/105 |
| 6,601,486 B2 | 8/2003 | Hansson et al. | |
| 6,796,750 B2* | 9/2004 | Men | B23C 5/2221 407/102 |
| 6,948,889 B2* | 9/2005 | Arvidsson | B23C 5/06 407/113 |
| 7,156,006 B2* | 1/2007 | Hyatt | B23B 1/00 279/8 |
| 7,325,471 B2* | 2/2008 | Massa | B23B 27/12 279/8 |
| 7,387,474 B2* | 6/2008 | Edler | B23B 27/1611 407/103 |
| 9,120,154 B2* | 9/2015 | Hecht | B23B 27/1622 |
| 9,409,240 B2* | 8/2016 | Matsubara | B23C 5/2221 |
| 2004/0028486 A1* | 2/2004 | Englund | B23B 27/1622 407/90 |
| 2005/0152754 A1* | 7/2005 | Wiman | B23B 27/145 407/103 |
| 2005/0244233 A1* | 11/2005 | Jonsson | B23B 27/1618 407/116 |
| 2006/0245837 A1 | 11/2006 | Dufour et al. | |
| 2007/0122242 A1* | 5/2007 | Englund | B23B 27/1622 407/103 |
| 2007/0183857 A1 | 8/2007 | Wihlborg | |
| 2007/0248425 A1 | 10/2007 | Andersson et al. | |
| 2011/0020072 A1 | 1/2011 | Chen et al. | |
| 2011/0103905 A1* | 5/2011 | Morrison | B23C 5/2213 407/48 |
| 2011/0305532 A1 | 12/2011 | Harif | |
| 2012/0251250 A1* | 10/2012 | Morrison | B23C 5/2221 407/42 |
| 2014/0086696 A1* | 3/2014 | Fang | B23C 5/2221 407/99 |

FOREIGN PATENT DOCUMENTS

| | | |
|---|---|---|
| JP | S61-092501 U | 6/1986 |
| JP | H07 299633 A | 11/1995 |
| WO | WO 2004/056514 | 7/2004 |
| WO | WO 2011/056840 | 5/2011 |

OTHER PUBLICATIONS

Office action dated Apr. 29, 2015 issued in Chinese counterpart application (No. 201280049086.6) with English translation.
Office action dated Jun. 2, 2015 issued in Japanese counterpart application (No. 2013-537574).
International Preliminary Report on Patentability (IPRP) dated Apr. 17, 2014 issued in PCT counterpart application (PCT/JP2012/075998).
Office action dated Jun. 18, 2015 issued in Russian counterpart application (No. 2014113348) with English translation.
International Search Report dated Dec. 25, 2012 issued in PCT counterpart application (No. PCT/JP2012/075998).

* cited by examiner

CUTTING-EDGE REPLACEABLE CUTTING TOOL

RELATED APPLICATIONS

This is a Continuation of PCT/JP2012/075998, filed Oct. 5, 2012 and published in Japanese as WO 2012/051703A1 on Apr. 11, 2013, which claims priority to JP 2011-223446, filed Oct. 7, 2011 and JP 2011-223054, also filed Oct. 7, 2011. The contents of the aforementioned applications are incorporated by reference in their entirety.

TECHNICAL FIELD

The present invention relates to a cutting-edge replaceable cutting tool provided with a removable cutting insert.

BACKGROUND ART

For a cutting-edge replaceable cutting tool clamping a cutting insert to a body, stably clamping the cutting insert not to move during cutting processing is a crucial element for determining surface roughness of a finished surface. Therefore, in a conventional field of the cutting-edge replaceable cutting tool, various types of methods for stably clamping the cutting insert are proposed. For example, the Patent Literature 1 discloses a configuration in which a recessed portion in a predetermined shape is formed at a lower surface side of the cutting insert, and on an insert mounting surface of the body for mounting the cutting insert, a protrusion corresponding to an outline shape of the recessed portion is formed so that the protrusion and the recessed portion fit with each other. This configuration restrains rotation of the cutting insert on the insert mounting face by fitting the protrusion into the recessed portion.

CITATION LIST

Patent Literature

PTL 1: Japanese Patent Application Laid-open No. 2003-533357

SUMMARY OF INVENTION

Technical Problem

However, the configuration disclosed in the Patent Literature 1 causes problems described below. In order to smoothly insert the protrusion formed on the insert mounting surface into the recessed portion of the cutting insert, a dimension of the protrusion is designed to be slightly smaller than a dimension of the recessed portion. Therefore, a slight clearance is formed between the protrusion and the recessed portion. Further, various types of dimensional errors in manufacturing are accumulated. Thus, a portion where the protrusion and the recessed portion come into contact with each other varies depending on a clearance and dimensional errors. As a result, a rotational moment caused by cutting resistance acting on the cutting insert cannot be stably sustained. In other words, when the protrusion and the recessed portion come into contact irregularly, the rotational moment acting on the cutting insert cannot be received under the same condition, and thus the surface roughness of the finished surface may not be constant.

One of the purposes of the present invention is to provide the cutting-edge replaceable cutting tool having a configuration capable of stably sustaining the rotational moment acting on the cutting insert clamped onto the insert mounting surface of the body.

Solution to Problem

A cutting-edge replaceable cutting tool (1) of the present invention includes: a plate-shaped cutting insert (10) including upper and lower opposite surfaces (11, 13) and a side surface (12) extending between the upper and lower surfaces;

a body (20) including an insert mounting portion (21) for removably mounting the cutting insert (10), the inset mounting portion (21) having a base surface (21A) for supporting the lower surface (13) of the cutting insert (10) and a sidewall surface (21B, 21C) for supporting the side surface (12) of the cutting insert (10); and a reception mechanism configured to receive a rotational moment, the rotational moment acting on the cutting insert (10) so as to rotate the cutting insert (10) mounted on the insert mounting portion (21) on the base surface (21A), wherein the reception mechanism includes a first engagement portion (14) formed on the lower surface of the cutting insert (10) and a second engagement portion (25) formed on the base surface (21A) of the insert mounting portion (21), and wherein the second engagement portion (25) is formed to engage with a specific portion (15), of a surface defining the first engagement portion (14), to receive the rotational moment.

Preferably, the insert mounting portion (21) includes a mounting hole (23) that is formed on the base surface to mount the cutting insert, wherein sidewall surfaces of the insert mounting portion (21) includes a first sidewall surface (21B) facing an outer peripheral side of the cutting-edge replaceable cutting tool (1) and a second sidewall surface (21C) facing a leading end side of the cutting-edge replaceable cutting tool (1), and wherein the second engagement portion (25) is formed at an opposite side of the first sidewall surface (21B) side with respect to a center axis (AX1) of the mounting hole (23) in a direction (D1) in which the first sidewall surface (21B) faces.

More preferably, in the second engagement portion (25), an abutment portion for abutting on the first engagement portion (14) is, in a direction (D2) in which the second sidewall surface (21C) faces, formed at the second sidewall surface (21C) side with respect to a center axis of the mounting hole (23).

Advantageous Effects of Invention

According to the present invention, since, in a reception mechanism, the second engagement portion is engaged with the specific portion of the first engagement portion to receive a rotational moment, the rotational moment caused by the cutting resistance that acts on the cutting insert can be stably sustained and, as a result, the finished surface roughness can be improved.

DESCRIPTION OF EMBODIMENTS

With reference to drawings, the embodiments according to the present invention will be described below.

First Embodiment

Figure 1:
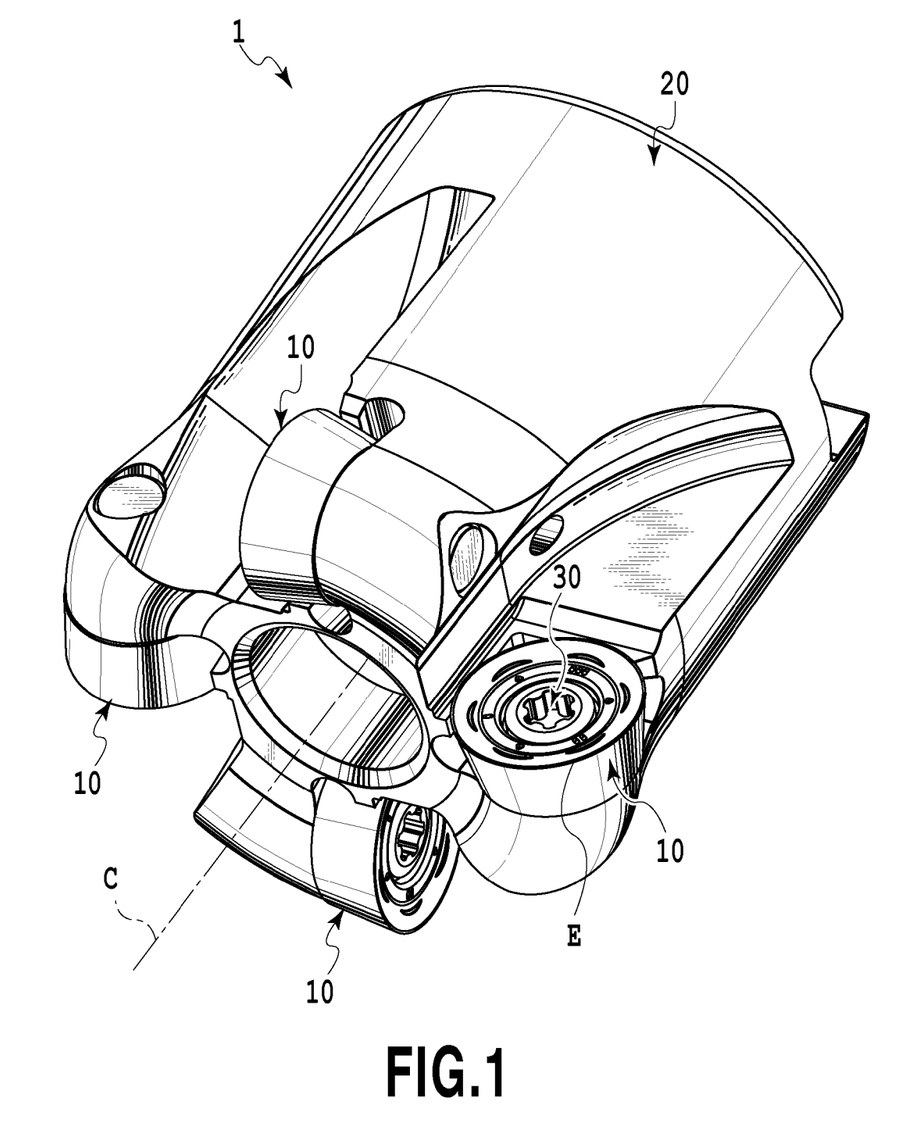
FIG. 1 is a perspective view of a cutting-edge replaceable cutting tool according to a first embodiment of the present invention.

As illustrated in FIG. 1, a cutting-edge replaceable cutting tool 1 (referred to as a "cutting tool 1" hereinafter) of the present embodiment includes a cutting insert 10, a body 20 on which the cutting insert 10 is detachably mounted, and a bolt 30 for fixing the cutting insert 10 onto the body 20. A definition of the "body" in the following description complies with the definition by Japanese Industrial Standards (JIS). The cutting tool 1 is a rotating tool for cutting a work as rotating about a rotational axis C.

Figure 2:
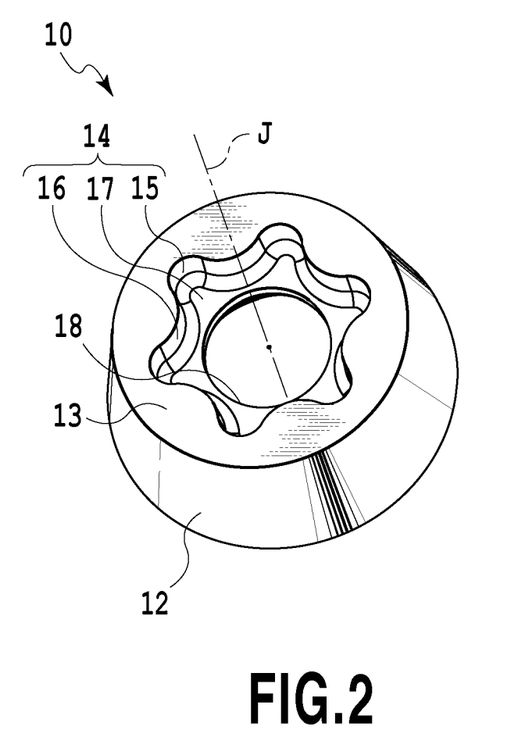
FIG. 2 is a perspective view illustrating a cutting insert illustrated in FIG. 1 when viewed from below.
Figure 3:
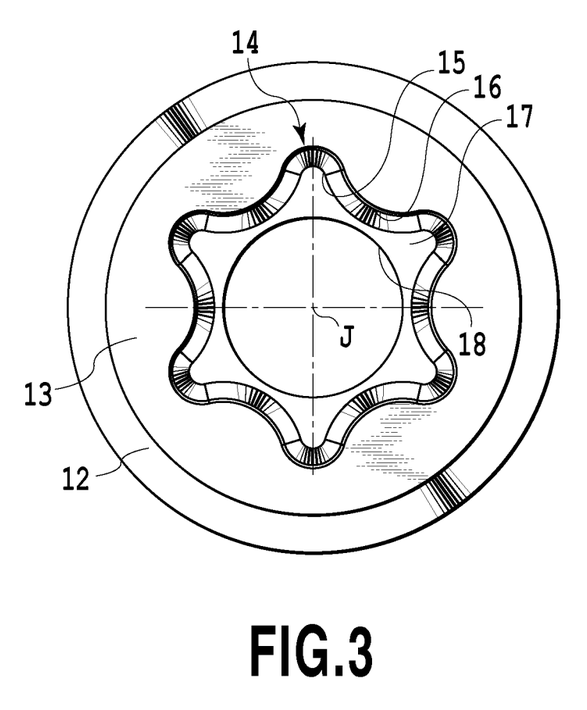
FIG. 3 is a rear view illustrating the cutting insert in the cutting tool illustrated in FIG. 1.
Figure 4:
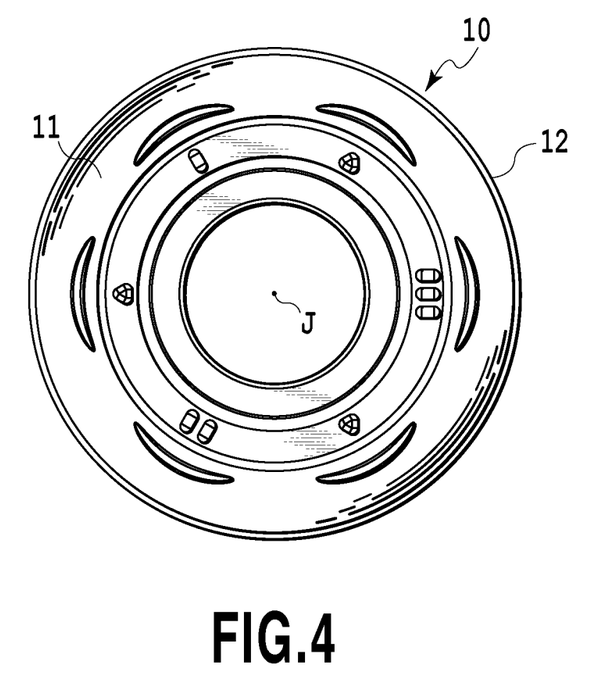
FIG. 4 is a plan view illustrating the cutting insert in the cutting tool illustrated in FIG. 1.

As illustrated in FIGS. 2 to 4, an outer shape of an upper surface 11 of the cutting insert 10 is formed in a circle. A clearance angle is provided at a side face 12, and the cutting insert 10 is formed in a positive-type cutting insert. Since an outer shape of a lower surface 13 is formed in a circle as well as that of the upper surface 11, the cutting insert 10 has a rotationally symmetrical shape with respect to a center axis J that is an axis line passing a centroid of the cutting insert 10. The cutting insert 10 is formed with a mounting hole 18 passing through the upper surface 11 and the lower surface 13, and a bolt 30 is inserted into the mounting hole 18. A center axis of the mounting hole 18 coincides with a center axis J of the cutting insert 10. A design formed on the upper surface 11 indicates a position when corner change is performed.

On the lower surface 13 of the cutting insert 10, a first engagement portion 14 defined by a recessed portion is formed. The first engagement portion 14 is defined by a bottom surface portion 17 surrounding the mounting hole 18 and a sidewall surface rising from an outer peripheral portion of the bottom surface portion 17. The sidewall surface includes six engagement recessed portions 15, each of which is curved in a recessed shape, regularly (at a same interval) disposed in a circumferential direction about the center axis J, and six curved protruding portions 16, each of which is curved in a protruding shape and disposed between adjacent engagement recessed portions 15. Of the plurality of engagement recessed portions 15, only the specific engagement recessed portion 15 is engaged with (abuts on) the engagement protruding portion 25A of a second engagement portion 25 described below. More specifically, the first engagement portion 14 has an outline shape having rotational symmetric property of six-fold symmetry with respect to the center axis J of the cutting insert 10. The plurality of engagement recessed portions 15 are regularly arranged around the center axis J so that, so called, corner change for replacing a worn out cutting edge that cannot be used anymore with another cutting edge can be performed. In other words, the cutting insert 10 can be indexed.

Figure 5:
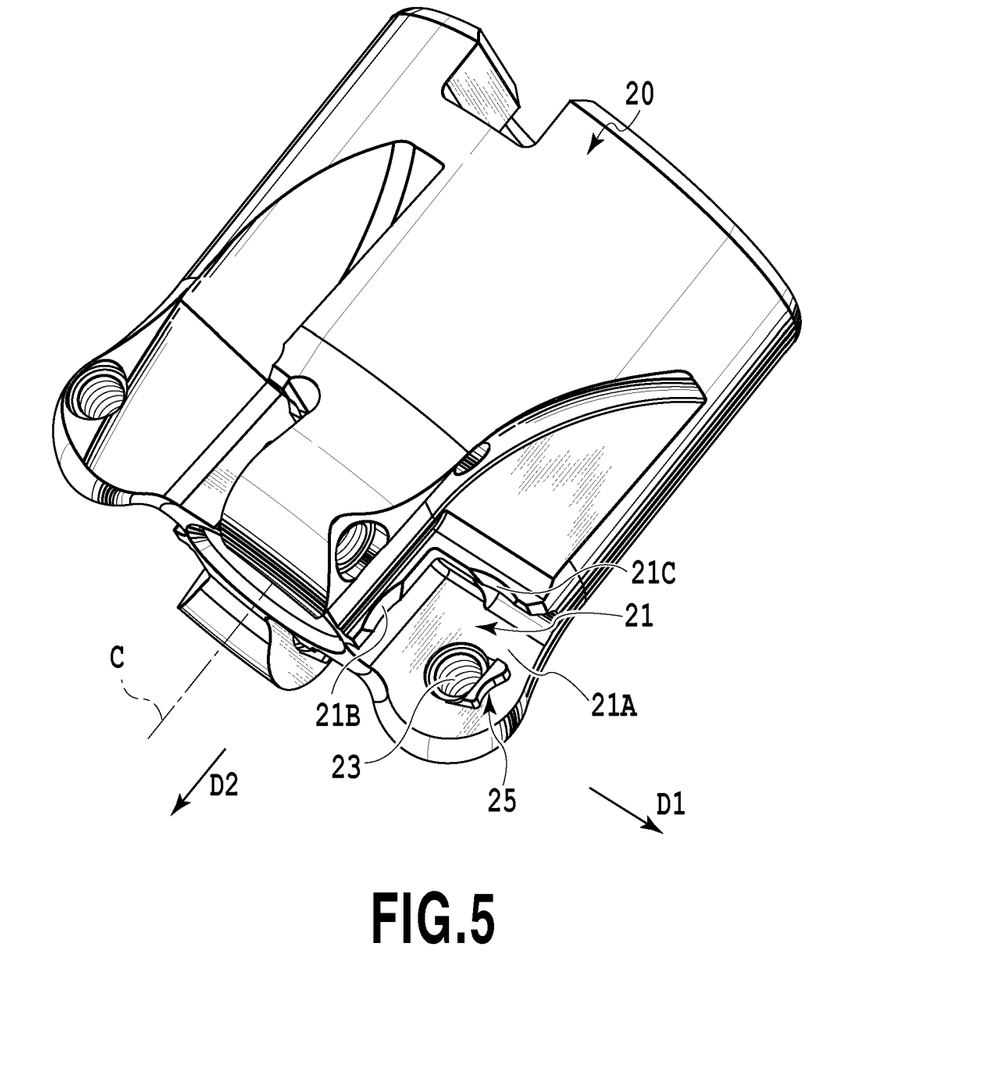
FIG. 5 is a perspective view illustrating a body in the cutting tool illustrated in FIG. 1.
Figure 6:
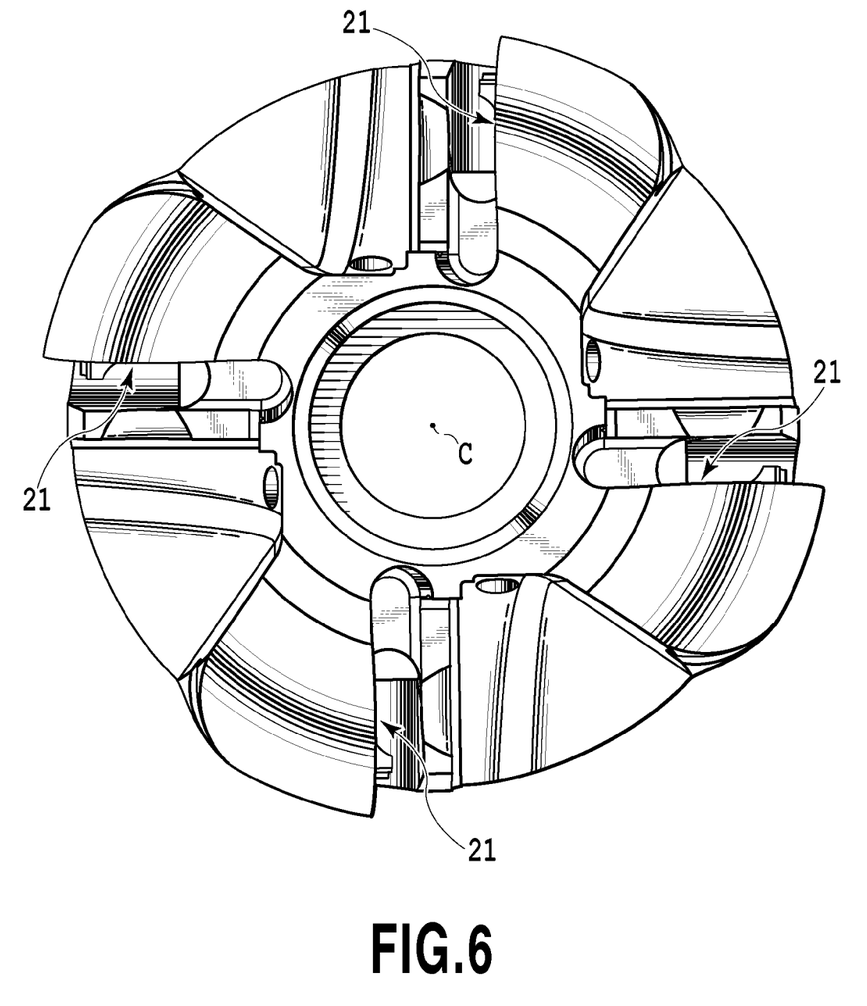
FIG. 6 illustrates the body in the cutting tool illustrated in FIG. 1 when viewed from a leading side.

As illustrated in FIGS. 5 and 6, the body 20 includes an insert mounting portion 21 for removably mounting the cutting insert 10. The insert mounting portion 21 is formed to cut off a part of a leading end portion of the body 20 and defined by a base surface 21A, a first sidewall surface 21B facing an outer peripheral direction D1 side, and a second sidewall face 21C facing a leading end direction D2 side and formed in a direction substantially orthogonal to the first sidewall surface 21B. On each of the first sidewall surface 21B and the second sidewall surface 21C, a curved face in a recessed shape for supporting the side surface 12 of the cutting insert is formed. On the base surface 21A, a screw hole (mounting hole) 23 is formed. The bolt 30 inserted into the cutting insert 10 is screwed with the screw hole 23 to clamp the cutting insert 10 onto the insert mounting portion 21.

Figure 7:
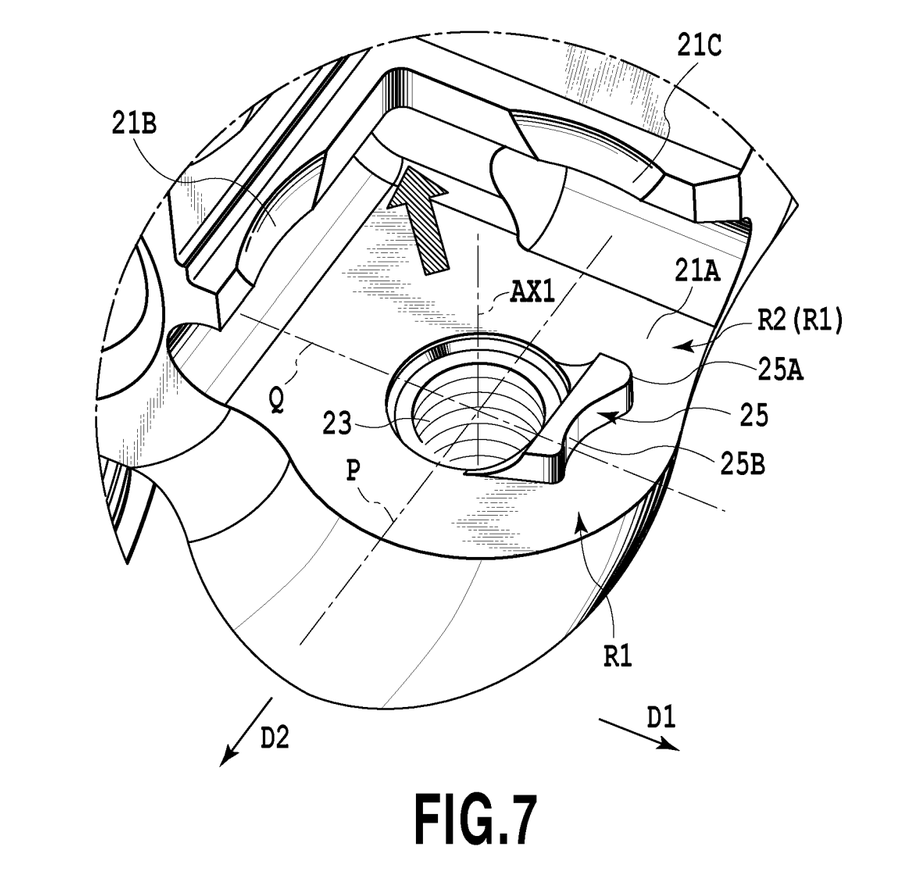
FIG. 7 is an enlarged view of an insert mounting portion of the body in the cutting tool illustrated in FIG. 1.

Further, on the base surface 21A, the second engagement portion 25 is formed. The second engagement portion 25 is defined by a protrusion protruding from the base surface 21A and received in the above-described first engagement portion 14 when the cutting insert 10 is mounted onto the insert mounting portion 21. The second engagement portion 25 includes, as illustrated in FIG. 7, the engagement protruding portion 25A including the sidewall surface curved in the protruding shape on one end portion of the second engagement portion 25. The engagement protruding portion 25A is fitted into and engaged with one previously specified first engagement recessed portion 15 of the plurality of above-described engagement recessed portions 15 to function to receive the rotational moment acting on the cutting insert 10 so as to rotate the cutting insert 10 mounted on the insert mounting portion 21 on the base surface 21A. In the sidewall surface of the second engagement portion 25, on a portion that does not abut on the engagement recessed portion 15 of the first engagement portion 14, a reinforcement portion 25B for reinforcing the second engagement portion 25 is formed. The reinforcement portion 25B includes a relief portion curved in the recessed shape to prevent interference with the curved protruding portion 16 of the first engagement portion 14.

A forming position of the engagement protruding portion 25A will be described herein.

The engagement protruding portion 25A of the second engagement portion is formed in a first region R1 at an opposite side of the first sidewall surface 21B side of two regions in the base surface 21A divided into two by a first virtual plane P that is orthogonal to the base surface 21A, passes through the centroid of the cutting insert 10 mounted on the insert mounting portion 21, and extends in a longitudinal direction of the body 20. In other words, the engagement protruding portion 25A is formed in the first region R1 positioned at an outer peripheral side of the body 20 of the two regions of the base surface 21A divided by the first virtual plane P that is in parallel with the rotational axis C of the body 20 and passes the centroid of an outer peripheral outline of the cutting insert 10. FIG. 7 does not indicate a state where the cutting insert 10 is mounted on the insert mounting portion 21, but when the cutting insert 10 is mounted on the insert mounting portion 21, a center axis AX1 of a mounting hole 23 passes a position of the centroid of the cutting insert 10. Further preferably, an abutting portion of the second engagement portion 25 that abuts on the first engagement portion 14 is formed in a second region R2 positioned at a second sidewall surface 21C side of two regions in the first region R1 divided into two by a second virtual plane Q that is orthogonal to the first virtual plane P, and passes the centroid of the cutting insert 10 mounted on the insert mounting portion 21.

Figure 8:
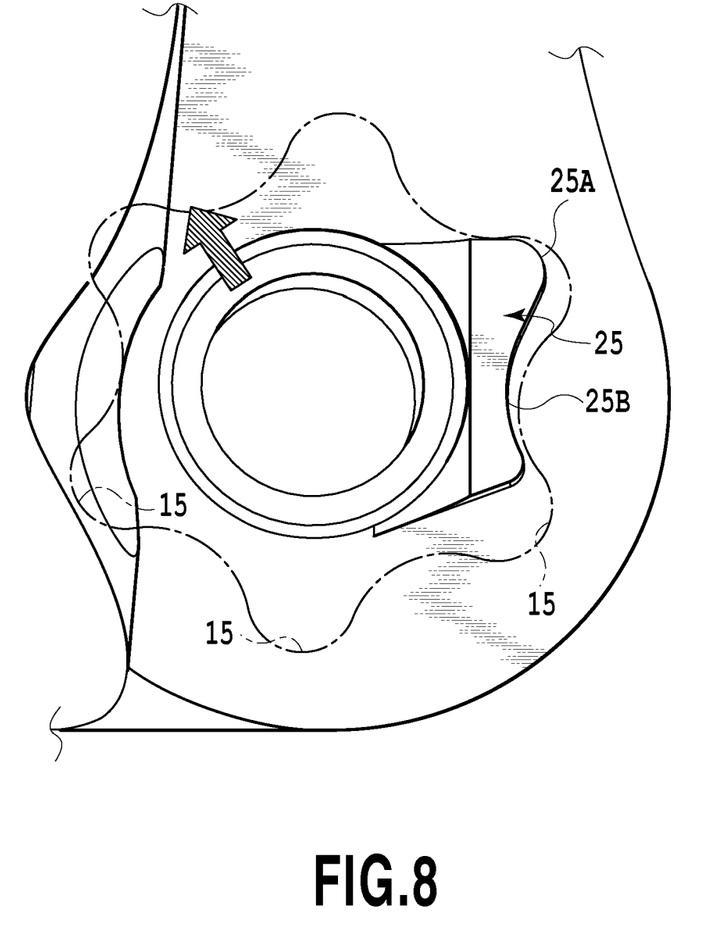
FIG. 8 is a schematic view illustrating a positional relationship between a first engagement portion and a second engagement portion.

FIG. 8 illustrates the positional relationship between the second engagement portion 25 and the engagement recessed portion 15 when the cutting insert 10 is fixed. As illustrated in FIG. 8, the engagement protruding portion 25A of the second engagement portion 25 abuts on an inner wall of the specific engagement recessed portion 15. To facilitate inserting the engagement protruding portion 25A into the engagement recessed portion 15, a dimension of the engagement protruding portion 25A is formed to be slightly smaller than a dimension of the engagement recessed portion 15. Further, a shape of a part of a wall surface of the engagement protruding portion 25A coincides with a shape of the engagement recessed portion 15 so that the engagement protruding portion 25A can surface contact with the inner wall of the engagement recessed portion 15. The reinforcement portion 25B integrally formed with the engagement protruding portion 25A does not come into contact with the first engagement portion 14 at all.

Then, effects obtained by the cutting-edge replaceable cutting tool of the present embodiment will be described below. When the cutting insert 10 receives the rotational moment caused by the cutting resistance, a rotational center becomes a contact portion between the second engagement portion 25 and the engagement recessed portion 15. Since the cutting tool 1 of the present embodiment includes only one contact portion described above, even if the dimensional errors in manufacturing are accumulated, a position of the contact portion only slightly varies within the inner wall face of the specific engagement recessed portion 15. Accordingly, in the cutting tool 1 of the present embodiment, the position of the rotational center of the cutting insert 10 during processing remains almost invariant. Therefore, an orientation of a reaction force acting on the cutting insert 10 from the second engagement portion 25 is kept almost invariant.

The second engagement portion 25 is formed in the first region R1 on the base surface 21A so that the orientation of the rotational moment caused by the cutting resistance can be always kept invariant. In other words, when the second engagement portion 25 is formed in a region which is opposite to the first region R1, as illustrated in FIG. 9B, the rotational moment MT by a thrust force T and a rotational moment MF by a feed force F act in directions opposite to each other. Thus, when a relationship in magnitude between the thrust force T and the feed force F is changed during cutting processing, the rotational moment applied to the cutting insert 10 becomes zero for a split second, and a clamping state of the cutting insert 10 becomes extremely unstable.

Figure 9A:
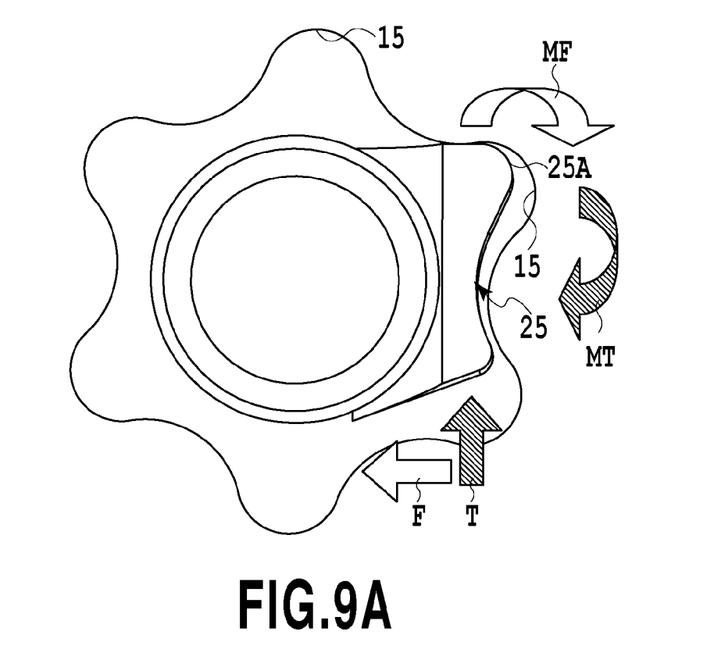
FIG. 9A is a schematic view illustrating a rotational moment applied to the cutting insert in the cutting tool according to the present embodiment.
Figure 9B:
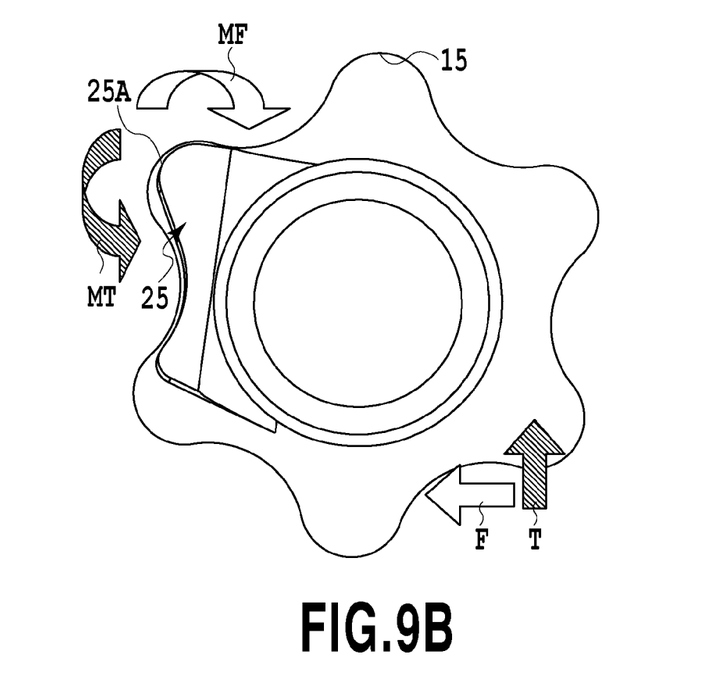
FIG. 9B is a schematic view illustrating a rotational moment applied to the cutting insert when the second engagement portion is formed at a position different from that of the present embodiment.

On the other hand, according to the present embodiment, since the second engagement portion 25 is formed in the first region R1, as illustrated in FIG. 9A, the orientations of the rotational moment by the thrust force (T) and the feed force (F) become the same. Therefore, the rotational moment in the same orientation is continued to be applied to the cutting insert 10 during the cutting processing. Thus, the clamping state of the cutting insert 10 becomes stable.

Further, the engagement protruding portion 25A is formed in the second region R2 positioned far away particularly from a main cutting edge E in the first region R1 so that the rotational moment caused by the cutting resistance around the contact portion between the engagement protruding portion 25A and the engagement recessed portion 15 is increased. As a result, the engagement protruding portion 25A stably receives the rotational moment acting on the cutting insert 10 to improve the clamp force also.

Furthermore, since a center of rotation of the cutting insert 10 is intentionally shifted to the second region R2, a direction in which the cutting insert 10 tends to be moved upon receiving the rotational moment caused by the cutting resistance is directed toward an intersecting region between the first and second sidewall surfaces 21B, 21C of the insert mounting portion 21 as indicated with arrows in FIGS. 7, 8. This direction is a direction that a movement of the cutting insert 10 is effectively restrained by the first and second sidewall surfaces 21B, 21C of the insert mounting portion 21.

As described above, since the forming position of the second engagement portion 25 is contrived for the cutting tool 1 of the present embodiment, the rotation of the cutting insert 10 can be effectively restricted, and an effect in which the first and second sidewall surfaces 21B, 21C of the insert mounting portion 21 restrict the rotation of the cutting insert 10 is also maximized.

Second Embodiment

Figure 10A:
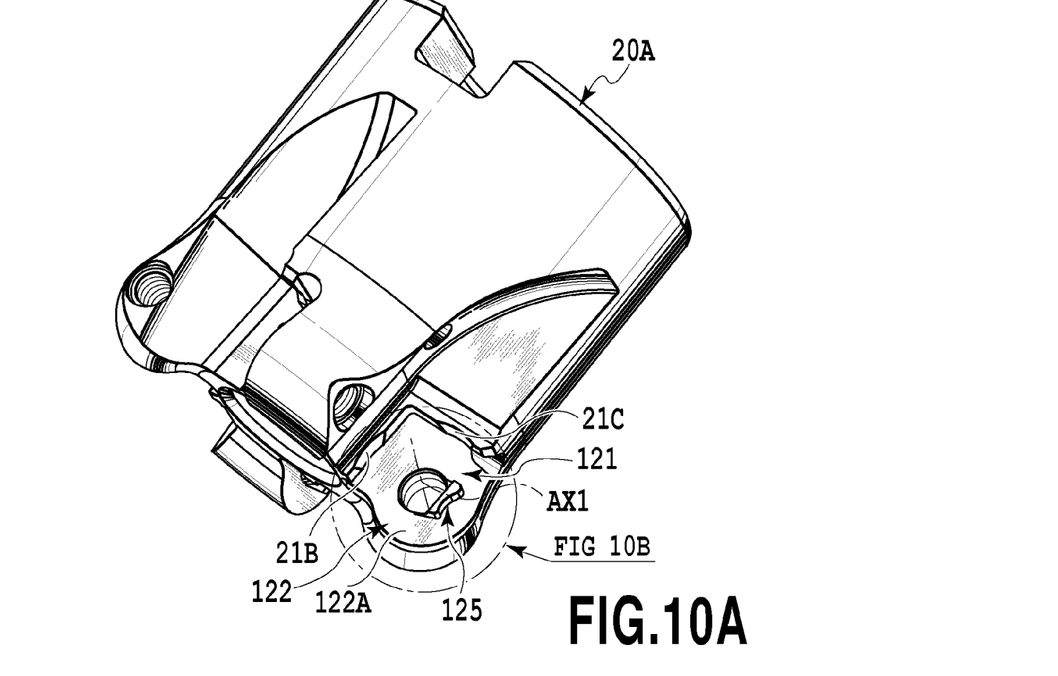
FIG. 10A is a perspective view illustrating a body of a cutting tool according to a second embodiment of the present invention.
Figure 10B:
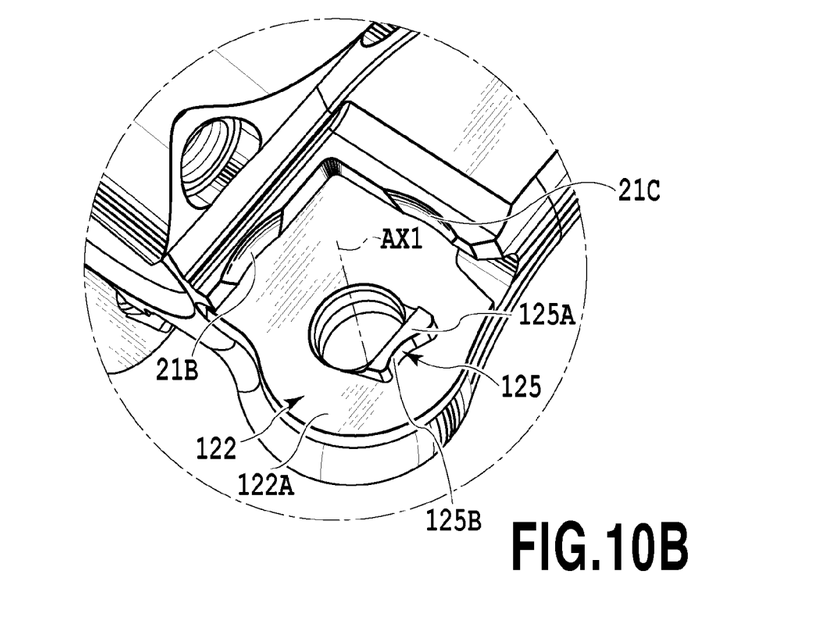
FIG. 10B is an enlarged view of a circled portion illustrated in FIG. 10A.

FIG. 10B is an enlarged view illustrating an insert mounting portion of a body according to a second embodiment. As illustrated in FIG. 10B, an insert mounting portion 121 includes a shim 122 unlike the first embodiment. In order to cover an entire bottom surface of the insert mounting portion 121, the shim 122 is formed in an almost same shape as that of the bottom surface. One face of the shim 122 functions as a base surface 122A for supporting the lower surface 13 of the cutting insert 10. On the base surface 122A, a second engagement portion 125 having the same configuration as the second engagement portion 25 described above is formed. The forming position of the second engagement portion 125 is in the first region R1 on the base surface 122A of the shim 122 similarly to the first embodiment, and more preferably, the second region R2. The insert mounting portion 21 includes the shim 122 so that material thereof can be changed to material different from the material of the body 20 to improve rigidity of the second engagement portion 125. The rigidity of the second engagement portion 125 is improved so that the second engagement portion 125 can effectively and stably receive the rotational moment acting on the cutting insert 10. Further, in such a case where in the second engagement portion 125 there is any breakage, since only the shim 122 can be replaced, the second embodiment is economical in comparison with the first embodiment.

The cutting-edge replaceable cutting tool of the present invention is not limited to the above-described embodiment. The above-described embodiment describes a case where the first engagement portion 14 is defined by the recessed portion formed on the lower surface 13 of the cutting insert 10, and the second engagement portion 25 is formed on the base surface 21A and defined by the protrusion that can be received in the recessed portion, and be engaged with the part of the sidewall surface to define the recessed portion. For example, contrary to the above-described embodiment, it can be configured that the first engagement portion 14 is defined by the protrusion formed on the lower surface 13 of the cutting insert 10, and the second engagement portion 25 is defined by the recessed portion that is formed on the base surface 21A, can receive the protrusion, and includes the engagement portion capable of being engaged with the part of the sidewall surface to define the protrusion.

As to the shape of the cutting insert too, in addition to the positive type of the cutting insert, a negative type thereof having no positive clearance angle on the side surface can be adopted. Further, the shape of the entire cutting insert is not particularly restricted and, thus, the cutting inserts in various types of shapes can be adopted. For example, a C type, a D type, an S type, a T type, a W type, a V type and a Y type specified by "JIS-B4120-1998" can be also adopted.

The outline shape of the recessed portion defining the first engagement portion 14 provided for the cutting insert may have a simple shape such as a circle or a rectangle. In that case, if the cutting insert has the rotational symmetric property of "n"-fold symmetry ("n" is an integer of 2 or more) with respect to the axis thereof, and further, the plurality of engagement recessed portions is formed, the corner change of the cutting insert can be easily performed. When the recessed portion has the shape including the engagement recessed portions similarly to the above-described embodiment, the number of the engagement recessed portions is not particularly restricted. The number of the engagement recessed portions may be larger than, or smaller than 6 indicated in the abovementioned embodiment.

As to the protrusion defining the second engagement portion formed at the insert mounting portion too, according to the above-described embodiment, the protrusion includes only one engagement protruding portion, but the number of the engagement protruding portions may be two or more. However, all engagement protruding portions need to be formed within the first region R1 on the base surface. It is further preferable that the shape described above in the embodiment, in other words, only one engagement protruding portion be included and, furthermore, the engagement protruding portion be formed within the second region R2.

Figure 11:
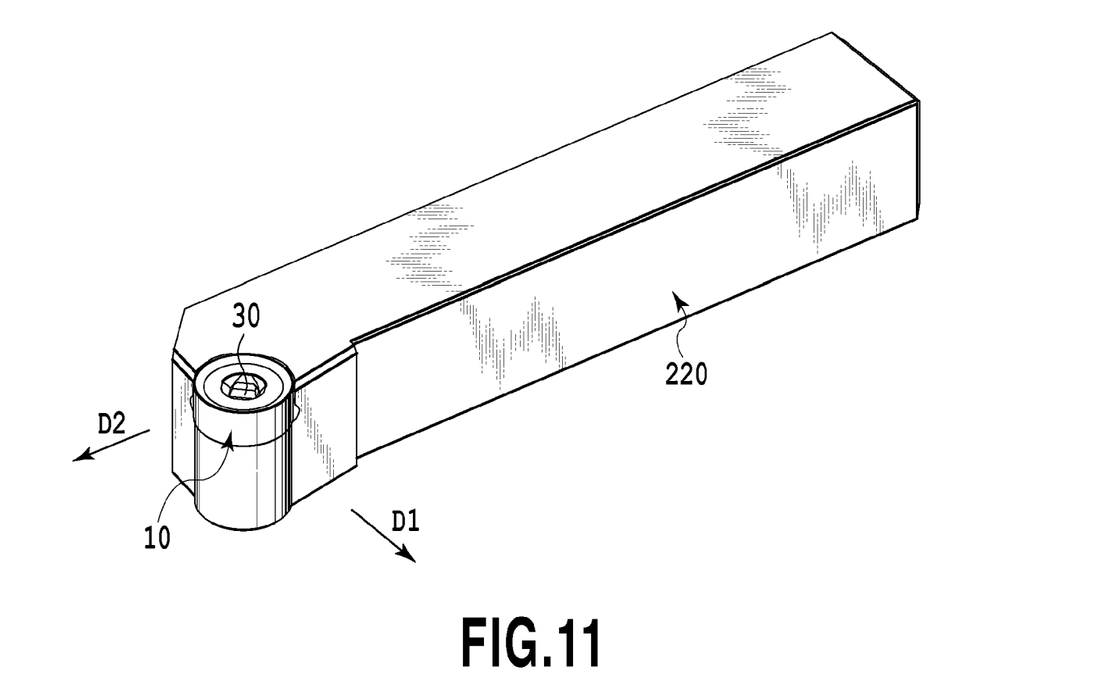
FIG. 11 is a perspective view illustrating another example of the cutting-edge replaceable cutting tool to which the present invention can be applied.

FIG. 11 is a perspective view illustrating another example of the cutting-edge replaceable cutting tool to which the present invention can be applied. In the above-described embodiment, a case where the present invention is applied to the rotating tool is described as an example, but the present invention is not limited thereto. As illustrated in FIG. 11, the present invention can be applied to the turning tool, in which the cutting insert 10 is removably mounted on the leading end portion of a body 220. In this case, the second engagement portion is formed in the first region R1 (region at the outer peripheral side) in a direction D1 in which the first sidewall surface 21B faces, of the two regions in the base surface 21A divided into two by the virtual plane P similarly to the above-described embodiment. More preferably, in the second engagement portion, the abutment portion for abutting on the first engagement portion is formed in the second region R2 positioned at the second sidewall surface side of the two regions divided by the virtual plane Q in the first region R1, in other words, in the region at the second sidewall surface side in a direction D2 (longitudinal direction of the body 220) in which the second sidewall surface faces.

In the above-described embodiment, a case where the mounting hole is formed on the base surface of the insert mounting portion is described. However, the invention of the present application is not limited to the above-described embodiment and the invention thereof can be applied to a case where the cutting insert is clamped by another clamping method different from the clamping method for clamping the cutting insert by using the bolt to the mounting hole on the base surface of the insert mounting portion.

In the above-described embodiment, a case where the virtual planes P and Q pass the centroid of the cutting insert is described, but when the cutting insert has a specific shape, the virtual planes P and Q may pass the centroid of an upper surface (rake face) of the cutting insert.

Further, in the above-described embodiment, a case where the virtual planes P and Q pass the centroid of the cutting insert is described, but in place of passing the centroid thereof, the virtual planes P and Q may pass a center of an inscribed circle inscribed an outer shape of the upper surface of the cutting insert.

REFERENCE SIGNS LIST

1 . . . cutting-edge replaceable cutting tool
10 . . . cutting insert
11 . . . upper surface
12 . . . side surface
13 . . . lower surface
14 . . . first engagement portion
15 . . . engagement recessed portion
16 . . . curved protruding portion
17 . . . bottom surface portion
18 . . . mounting hole
J . . . center axis
E . . . main cutting edge
C . . . rotational axis
20 . . . body
21 . . . insert mounting portion
21A . . . base surface
21B . . . first sidewall surface
21C . . . second sidewall surface
23 . . . screw hole
AX1 . . . center axis
25 . . . second engagement portion
25A . . . engagement protruding portion
25B . . . relief portion
122 . . . shim
122A . . . base surface
P . . . first virtual plane
Q . . . second virtual plane

What is claimed is:

1. A cutting-edge replaceable cutting tool comprising:
a plate-like cutting insert comprising upper and lower opposite surfaces and a side surface extending between the upper and lower surfaces;
a body including an insert mounting portion for removably mounting the cutting insert, the insert mounting portion having a base surface for supporting the lower surface of the cutting insert and a sidewall surface for supporting the side surface of the cutting insert; and
a reception mechanism configured to receive a rotational moment, the rotational moment acting on the cutting insert so as to rotate the cutting insert mounted on the insert mounting portion on the base surface, wherein the reception mechanism includes a first engagement portion formed on the lower surface of the cutting insert and a second engagement portion formed on the base surface of the insert mounting portion, wherein the second engagement portion is formed to engage with a specific portion, of a surface defining the first engagement portion, to receive the rotational moment;

wherein the sidewall surface of the insert mounting portion includes a first sidewall surface facing an outer peripheral side of the cutting-edge replaceable cutting tool and a second sidewall surface facing a leading end side of the cutting-edge replaceable cutting tool;

wherein the second engagement portion is formed in a first region at an opposite side of the first sidewall surface side, of two regions in the base surface divided into two by a first virtual plane in a longitudinal direction of the body, the first virtual plane being orthogonal to the base surface and passing a center of an inscribed circle inscribed in an outer shape of the upper surface of the cutting insert mounted on the insert mounting portion; and wherein, in the second engagement portion, an abutment portion for abutting on the first engagement portion is formed at the second sidewall surface side, of two regions on the base surface, in the first region, divided into two by a second virtual plane that is orthogonal to the first virtual plane and passes the center of the inscribed circle.

2. The cutting-edge replaceable cutting tool according to claim 1,
wherein the insert mounting portion has a shim which is disposed between the body and the cutting insert and which defines the base surface, and
wherein the second engagement portion is formed on the shim.

3. The cutting-edge replaceable cutting tool according to claim 1,
wherein the insert mounting portion includes a mounting hole that is formed on the base face to mount the cutting insert, and
wherein the second engagement portion is formed non-rotationally symmetrically with respect to a center axis of the mounting hole.

4. The cutting-edge replaceable cutting tool according to claim 1,
wherein the first engagement portion comprises a plurality of engagement portions that are arranged at an equal interval along a circumference of a circle about an axis passing the centroid of the upper surface or the center of the inscribed circle of the cutting insert, each capable of being engaged with the second engagement portion.

5. The cutting-edge replaceable cutting tool according to claim 4,
wherein the insert mounting portion includes a mounting hole that is formed on the base face to mount the cutting insert, and
wherein the second engagement portion is formed non-rotationally symmetrically with respect to a center axis of the mounting hole.

6. A cutting-edge replaceable cutting tool comprising:
a plate-like cutting insert comprising upper and lower opposite surfaces and a side surface extending between the upper and lower surfaces;
a body including an insert mounting portion for removably mounting the cutting insert, the insert mounting portion having a base surface for supporting the lower surface of the cutting insert and a sidewall surface for supporting the side surface of the cutting insert; and
a reception mechanism configured to receive a rotational moment, the rotational moment acting on the cutting insert so as to rotate the cutting insert mounted on the insert mounting portion on the base surface,
wherein the reception mechanism includes a first engagement portion formed on the lower surface of the cutting insert and a second engagement portion formed on the base surface of the insert mounting portion,
wherein the second engagement portion is formed to engage with a specific portion, of a surface defining the first engagement portion, to receive the rotational moment;
wherein the first engagement portion is defined by a recessed portion formed on the lower surface of the cutting insert, and
wherein the second engagement portion is defined by a protrusion that is formed on the base surface and that can be received in the recessed portion and be engaged with a part of a sidewall surface to define the recessed portion.

7. The cutting-edge replaceable cutting tool according to claim 6,
wherein the insert mounting portion has a shim which is disposed between the body and the cutting insert and which defines the base surface, and
wherein the second engagement portion is formed on the shim.

8. The cutting-edge replaceable cutting tool according to claim 6,
wherein the insert mounting portion includes a mounting hole that is formed on the base face to mount the cutting insert, and
wherein the second engagement portion is formed non-rotationally symmetrically with respect to a center axis of the mounting hole.

9. The cutting-edge replaceable cutting tool according to claim 6,
wherein the first engagement portion comprises a plurality of engagement portions that are arranged at an equal interval along a circumference of a circle about an axis passing the centroid of the upper surface or the center of the inscribed circle of the cutting insert, each capable of being engaged with the second engagement portion.

10. The cutting-edge replaceable cutting tool according to claim 9,
wherein the insert mounting portion includes a mounting hole that is formed on the base face to mount the cutting insert, and
wherein the second engagement portion is formed non-rotationally symmetrically with respect to a center axis of the mounting hole.

11. A cutting-edge replaceable cutting tool comprising:
a plate-like cutting insert comprising upper and lower opposite surfaces and a side surface extending between the upper and lower surfaces;
a body including an insert mounting portion for removably mounting the cutting insert, the insert mounting portion having a base surface for supporting the lower surface of the cutting insert and a sidewall surface for supporting the side surface of the cutting insert; and
a reception mechanism configured to receive a rotational moment, the rotational moment acting on the cutting insert so as to rotate the cutting insert mounted on the insert mounting portion on the base surface, wherein the reception mechanism includes a first engagement portion formed on the lower surface of the cutting insert and a second engagement portion formed on the base surface of the insert mounting portion, wherein the second engagement portion is formed to engage with a specific portion, of a surface defining the first engagement portion, to receive the rotational moment; and wherein the first engagement portion has an outline shape having "n"-fold symmetry ("n" is an integer of 2 or more) with respect to an axis passing the centroid of the upper surface or the center of the inscribed circle of the cutting insert.

12. The cutting-edge replaceable cutting tool according to claim 11, wherein the insert mounting portion has a shim which is disposed between the body and the cutting insert and which defines the base surface, and wherein the second engagement portion is formed on the shim.

13. The cutting-edge replaceable cutting tool according to claim 11, wherein the insert mounting portion includes a mounting hole that is formed on the base face to mount the cutting insert, and wherein the second engagement portion is formed non-rotationally symmetrically with respect to a center axis of the mounting hole.

14. The cutting-edge replaceable cutting tool according to claim 11, wherein the first engagement portion comprises a plurality of engagement portions that are arranged at an equal interval along a circumference of a circle about an axis passing the centroid of the upper surface or the center of the inscribed circle of the cutting insert, each capable of being engaged with the second engagement portion.

15. The cutting-edge replaceable cutting tool according to claim 14, wherein the insert mounting portion includes a mounting hole that is formed on the base face to mount the cutting insert, and wherein the second engagement portion is formed non-rotationally symmetrically with respect to a center axis of the mounting hole.

* * * * *